(12) United States Patent
Swanson et al.

(10) Patent No.: US 8,100,239 B2
(45) Date of Patent: Jan. 24, 2012

(54) CLUTCH DEVICE AND METHODS

(75) Inventors: Craig M. Swanson, Perham, MN (US); Thomas M. Jagger, Golden Valley, MN (US)

(73) Assignee: Kit Masters Inc., Perham, MN (US)

( * ) Notice: Subject to any disclaimer, the term of this patent is extended or adjusted under 35 U.S.C. 154(b) by 816 days.

(21) Appl. No.: 12/016,279

(22) Filed: Jan. 18, 2008

(65) Prior Publication Data
US 2009/0183963 A1  Jul. 23, 2009

(51) Int. Cl.
*F16D 29/00* (2006.01)
(52) U.S. Cl. .................. 192/48.2; 192/48.3; 192/66.22; 192/84.3; 192/113.21; 310/105
(58) Field of Classification Search ................ 192/48.3; 310/107
See application file for complete search history.

(56) References Cited

U.S. PATENT DOCUMENTS

| | | | |
|---|---|---|---|
| 768,384 A | 8/1904 | Lockwood | |
| 1,371,391 A | 3/1921 | Ollard | |
| 2,172,311 A | 9/1939 | Thomas | |
| 2,259,461 A | 10/1941 | Eason | |
| 2,357,620 A | 9/1944 | Thomas | |
| 2,369,328 A | 2/1945 | Watts | |
| 2,614,396 A | 10/1952 | Ratermann | |
| 2,742,179 A | 4/1956 | Livers | |
| 3,077,252 A | 2/1963 | Treer | |
| 3,109,555 A | 11/1963 | Samans | |
| 3,185,250 A | 5/1965 | Glazier | |
| 3,202,252 A | 8/1965 | Schilling | |
| 3,253,687 A | 5/1966 | Young | |
| 3,312,319 A | 4/1967 | Carroll et al. | |
| 3,396,909 A | 8/1968 | Knapp | |
| 3,409,305 A | 11/1968 | Nieland | |
| 3,517,683 A | 6/1970 | Chandler | |
| 3,684,397 A | 8/1972 | Elmer | |
| 3,762,517 A | 10/1973 | Hanks | |
| 4,132,301 A | 1/1979 | Zabonick | |
| 4,199,048 A | 4/1980 | Ishikawa | |
| 4,226,095 A | 10/1980 | Loken | |
| 4,231,457 A | 11/1980 | Cornish | |
| 4,352,365 A | 10/1982 | Boccardo et al. | |
| 4,355,710 A | 10/1982 | Schilling | |

(Continued)

FOREIGN PATENT DOCUMENTS

SU  731918  5/1980

OTHER PUBLICATIONS

"Welcome to Kitmasters," [online]. Kit Masters, 2004, [retrieved on Dec. 14, 2000]. Retrieved from the Internet: <URL: www.kit-masters.com>, 7 pages.

(Continued)

*Primary Examiner* — Rodney Bonck
(74) *Attorney, Agent, or Firm* — Oblon, Spivak, McClelland, Maier & Neustadt, L.L.P.

(57) ABSTRACT

Some embodiments of a clutch system may drive an output member to rotate at a first speed when the opposing clutch surfaces are engaged and to rotate at a second speed when the clutch surfaces are shifted to a disengaged position. In particular embodiments, the multi-speed clutch system may employ an eddy current drive system that causes the output portion to rotate even when the opposing clutch surfaces are disengaged.

16 Claims, 9 Drawing Sheets

U.S. PATENT DOCUMENTS

| | | | |
|---|---|---|---|
| 4,408,685 | A | 10/1983 | Schilling et al. |
| 4,418,807 | A | 12/1983 | Raines |
| 4,423,803 | A | 1/1984 | Malloy |
| 4,425,993 | A | 1/1984 | Schilling |
| 4,450,947 | A | 5/1984 | Hanks |
| 4,456,110 | A | 6/1984 | Hanks et al. |
| 4,460,079 | A | 7/1984 | Hanks |
| 4,483,430 | A | 11/1984 | Carmichael et al. |
| 4,541,516 | A | 9/1985 | Fenzel |
| 4,570,849 | A | 2/1986 | Klaucke et al. |
| 4,593,801 | A * | 6/1986 | Takeuchi et al. ............ 192/70.15 |
| 4,628,953 | A | 12/1986 | Correll et al. |
| 4,657,126 | A | 4/1987 | Hanks et al. |
| 4,750,595 | A | 6/1988 | Dayen et al. |
| 4,766,986 | A | 8/1988 | Dayen et al. |
| 4,770,281 | A | 9/1988 | Hanks |
| 4,826,064 | A | 5/1989 | Dayen et al. |
| 4,830,161 | A | 5/1989 | Hall et al. |
| 4,846,315 | A | 7/1989 | Dayen |
| 4,872,535 | A | 10/1989 | Dayen et al. |
| 4,877,117 | A | 10/1989 | Kniebel et al. |
| 4,909,367 | A | 3/1990 | Elmer |
| 4,934,500 | A | 6/1990 | Hanks et al. |
| 5,059,161 | A | 10/1991 | Bredt |
| 5,215,175 | A | 6/1993 | Fenzel |
| 5,242,036 | A | 9/1993 | Hennessy et al. |
| 5,355,983 | A | 10/1994 | Radomski et al. |
| 5,398,794 | A | 3/1995 | Walberg et al. |
| 5,405,254 | A | 4/1995 | Hennessy et al. |
| 5,427,609 | A | 6/1995 | Zoglman et al. |
| 5,586,635 | A | 12/1996 | Nelson et al. |
| 5,586,636 | A * | 12/1996 | Linnig ............................ 192/48.3 |
| 5,611,415 | A | 3/1997 | Davis et al. |
| 5,613,586 | A | 3/1997 | Schilling et al. |
| 5,624,016 | A | 4/1997 | Coulter et al. |
| 5,636,719 | A | 6/1997 | Davis et al. |
| 5,665,882 | A | 9/1997 | Chung et al. |
| 5,667,045 | A | 9/1997 | Cummings, III |
| 5,704,461 | A | 1/1998 | Vatsaas et al. |
| 5,752,810 | A | 5/1998 | Hein |
| 5,765,672 | A | 6/1998 | Briggs et al. |
| 5,877,117 | A | 3/1999 | Anderson et al. |
| 5,878,858 | A | 3/1999 | Hein |
| 5,896,971 | A | 4/1999 | Hein |
| 5,897,107 | A | 4/1999 | Zierden et al. |
| 5,913,396 | A | 6/1999 | Hein |
| 5,984,070 | A | 11/1999 | Briggs et al. |
| 5,994,810 | A | 11/1999 | Davis et al. |
| 6,092,638 | A | 7/2000 | Vatsaas |
| 6,109,871 | A | 8/2000 | Nelson et al. |
| 6,135,029 | A | 10/2000 | Oberjohn |
| 6,253,716 | B1 | 7/2001 | Palmer et al. |
| 6,273,221 | B1 | 8/2001 | Schmidt |
| 6,507,790 | B1 | 1/2003 | Radomski |
| 6,548,929 | B2 | 4/2003 | Nelson et al. |
| 6,600,249 | B2 | 7/2003 | Nelson et al. |
| D478,093 | S | 8/2003 | Bentley |
| 6,661,144 | B1 * | 12/2003 | Diener et al. ................. 310/105 |
| 6,811,011 | B2 | 11/2004 | Bastien |
| 6,838,796 | B1 | 1/2005 | Nelson |
| 6,912,353 | B2 | 6/2005 | Nelson et al. |
| 7,104,382 | B2 | 9/2006 | Swanson et al. |
| 2002/0014804 | A1 | 2/2002 | Nelson et al. |
| 2002/0021973 | A1 | 2/2002 | Nelson |
| 2006/0151278 | A1 | 7/2006 | Settineri |
| 2006/0201773 | A1 | 9/2006 | Swanson et al. |

OTHER PUBLICATIONS

"Fan Clutch Overhaul Instructions," Kit Masters, Ramsey, MN, 7 pages, date unknown.
"Kysor On/Off Diagnostic Guide," BorgWarner, http://www.ets.borgwarner.com, 2 pages, Jun. 2002.
"Fail Safe™ On/Off K22FA Front Air Fan Drives," Quik-Kool™ Cooling System Components, 20 pages, Jun. 2002.
"Fail Safe™ On/Off K22RA Rear Air Fan Clutch Service Guide," Quik-Kool™ Cooling System Components, 2 pages, Jun. 2002.
"Fail Safe™ On/Off K22FA Front Air Fan Clutch Service Guide," Quik-Kool™ Cooling System Components, 2 pages, Jun. 2002.
"Fail Safe™ On/Off K22RA/K22FA Front Air/Rear Air Lining Replacement," Quik-Kool™ Cooling System Components, 2 pages, Jun. 2002.
"Fail Safe™ On/Off K22RA/K26RA Rear Air Fan Clutch Replacement," Quik-Kool™ Cooling System Components, 2 pages, Jun. 2002.
"Fail Safe™ On/Off K22FA Front Air Line Installation," Quik-Kool™ Cooling System Components, 2 pages, Jun. 2002.
"Fail Safe™ On/Off K22RA/K26RA Fan Hub Series 1077," Quik-Kool™ Cooling System Components, 4 pages, Jun. 2002.
"Fail Safe™ On/Off K26RA Rear Air Lining Replacement," Quik-Kool™ Cooling System Components, 2 pages, Jun. 2002.
"Fail Safe™ On/Off K26RA Rear Air Fan Clutch Series 1090-09500," Quik-Kool™ Cooling System Components, 8 pages, Jun. 2002.
"Fail Safetm On/Off K22RA Rear Air Clutch Series, 1090-08500" Quik-Kool™ Cooling System Components, 8 pages, Jun. 2002.
"Drive Master® Spring-Engaged Fan Drives," Horton Product Catalogs, http://www.hortoninc.com/products/products.asp, printed from the internet on Oct. 27, 2005, 2 pages.
"Drive Master® Reman Spring-Engaged Fan Drives," Horton Product Catalogs, http://www.hortoninc.com/products/products.asp, printed from the internet on Oct. 27, 2005, 2 pages.
"Drive Master® Two-Speed Fan Drives," Horton Product Catalogs, http://www.hortoninc.corn/products/products.asp, printed from the internet on Oct. 27, 2005, 2 pages.
"Drive Master® PolarExtreme Spring-Engaged Fan Drives," Horton Product Catalogs, http://www.hortoninc.com/products/products.asp, printed from the internet on Oct. 27, 2005, 2 pages.
"HT/S Advantage™ Air-Engaged Fan Drives," Horton Product Catalogs, http://www.hortoninc.com/products/products.asp, printed from the internet on Oct. 27, 2005, 2 pages.
"Advantage Reman® Remanufactured Air-Engaged On/Off Fan Drives," Horton Product Catalogs, http://www.hortoninc.com/products/products.asp, printed from the internet on Oct. 27, 2005, 2 pages.
"PolarExtreme HT/S Reman Fan Drives," Horton Product Catalogs, http://www.hortoninc.com/products/products.asp, printed from the internet on Oct. 27, 2005, 2 pages.
"Klondike® Series Replacement Fan Clutches for K22RA Kits for Kysor's K22RA and K22FA," Horton Product Catalogs, http://www.hortoninc.com/products/products.asp, printed from the internet on Oct. 27, 2005, 3 pages.
"Klondike® Series Replacement Fan Clutch for Kysor's K22RA," Horton, Inc., 2 pages, 2004.
"Bendix® FD-L™ Fan Clutch," Bendix Service Data SD-09-8505, 8 pages, Apr. 2004.
"Bendix® FD-1™ Clutch Type Fan Drive," Bendix Service Data SD-9-8501, 8 pages, Apr. 2004.
"Bendix® FD-2™ Clutch Type Fan Drive," Bendix Service Data SD-09-8503, 8 pages, Apr. 2004.
"Bendix® FD-3™ TorqueMaster Fan Clutch," Bendix Service Data SD-09-8504, 8 pages, Apr. 2004.
Bendix Catalog Index, 20 pages, date unknown.
Horton Catalog, Mar. 1998, 70 pages.
"The Kysor K-22RA Fail Safe™ On-Off Fan Clutch," BorgWarner Cooling Systems, Apr. 2000, 2 pages.
"K-22RA Fan Drive," Kysor Cadillac, 20 pages, Jul. 1996.
"Engine Cooling Fans. Fan Spacers & Adapters," Horton, Inc., pp. 47-48, Jun. 2002.
"Installation and Service Guide—Kysor Front Air Fan Drives," Kysor Cooling Systems N. A., 24 pages, Oct. 1998.
BorgWarner 2004 Product Catalog, front and back covers and pp. 92-256 and 341-389.
Horton Heavy-Duty Vehicle Components Catalog, Jul. 2004, front and back covers and Table of Contents, pp. I-V.
Shigley et al., *Power Transmission Elements—A Mechanical Designer's Workbook*, 1990, New York, McGraw-Hill, pp. 76, 91-95.

* cited by examiner

CLUTCH DEVICE AND METHODS

TECHNICAL FIELD

This document relates to a rotational control apparatus, such as a clutch apparatus to control the rotation of a fan device or other instrument.

BACKGROUND

Vehicle transmission systems, cooling systems, and braking systems may employ clutches or like devices to selectively transmit rotational forces from a drive source to an output member. For example, some cooling systems employ fan clutches that control the output rotation of engine cooling fans. Such a fan clutch can be driven by a drive pulley that rotates in response to the vehicle engine.

In general, the clutch can be operated to engage (or disengage) opposing clutch surfaces, which rotationally interconnect (or rotationally disconnect) the drive pulley and the output member. In an example related to fan clutches, when the clutch surfaces shifted to the engaged position, the output member (carrying fan blades) is driven to rotate along with the drive pulley. However, when the clutch surfaces are shifted to the disengaged position, the output member is no longer directly urged by the drive pulley and may be free to stop rotating.

SUMMARY

Some embodiments of a clutch system may drive an output portion to rotate at a first speed when the clutch surfaces are engaged and to rotate at a second speed when the clutch surfaces are shifted to a disengaged position. In particular embodiments, the multi-speed clutch system may employ an eddy current drive system that causes the output portion to rotate even when the clutch surfaces are disengaged. The multi-speed clutch device can be useful, for example, to control the rotation of a cooling fan in a vehicle cooling system. In such circumstances, the cooling fan can be driven to rotate at a first speed due to rotational interconnection with a drive pulley or the like and to rotate at a second speed even when the clutch surfaces are disengaged. Thus, the clutch system facilitates the flow of cooling air both when the vehicle cooling system activates the fan (e.g., by causing the clutch surfaces to engage) and when the vehicle cooling system deactivates the fan (e.g., by causing the clutch surfaces to disengage).

Particular embodiments may include a fan clutch device to be mounted to a drive pulley. The fan clutch device may include an input portion that is removably mountable with the drive pulley so that the input portion rotates with the drive pulley. The fan clutch device may also include an output portion having: a hub that is selectively movable relative to the input portion, and a piston adjustable in an axial direction relative to the input portion. The piston may be adjustable between first and second positions. The fan clutch device may further include a frusto-conical clutch ring coupled to one of the input portion and the output portion. The clutch ring may include a frusto-conical surface that engages an opposing friction surface when the piston is in the first position so that the output portion is rotates at a first speed with the input portion. The fan clutch device may also include an eddy current drive system that urges the output portion to rotate at a second speed different from the first speed when the piston is in the second position. The eddy current drive system may have: permanent magnets coupled to one of the output portion and the input portion, and a ring of generally nonmagnetic material coupled to the other the output portion and the input portion so that a radial gap is defined between the permanent magnets and the ring of generally nonmagnetic material.

In some embodiments, a fan clutch device may include an input portion that is removably mountable to a drive pulley so that the input portion rotates with the drive pulley. The fan clutch device may also include an output portion including: a hub that is selectively movable relative to the input portion, and a piston adjustable in an axial direction relative to the input portion. The piston may be adjustable between first and second positions. The output portion may rotate at a first speed with the input portion when the piston is in the first position. The fan clutch device may further include an eddy current drive system that urges the output portion to rotate at a second speed different from the first speed when the piston is adjusted to the second position. The eddy current drive system may have: permanent magnets coupled to the output portion, and an electrically conductive ring coupled to the input portion and arranged radially outward from the permanent magnets so that a radial gap is defined between the permanent magnets and the ring. The electrically conductive ring may comprise radially extending cooling fins to dissipate heat. The cooling fins may be rotated with the drive pulley at all times when the input portion is mounted to the drive pulley.

These and other embodiments described herein may be configured to provide one or more of the following advantages. First, some embodiments of the clutch devices described herein can drive an output member to rotate at a first speed when the clutch surfaces are engaged and to rotate at a second speed when the clutch surfaces are shifted to a disengaged position. In particular, the clutch device can employ an eddy current drive system that urges the output portion of the clutch device to rotate at the second speed (which may be slower than the first speed).

Second, some embodiments of the clutch device can be implemented with a cooling fan so as to provide different levels of air flow output from the cooling fan. For example, the fan clutch device can be useful for cooling systems in some vehicles that operate with extended periods of idle, such as buses, vocational equipment (e.g., garbage trucks), or construction equipment vehicles. In such circumstances, the fan clutch device facilitates the flow of cooling air both when the vehicle cooling system activates the fan (e.g., by causing the clutch surfaces to engage) and when the vehicle cooling system deactivates the fan (e.g., by causing the clutch surfaces to disengage). As described below, periods of increased noise from the vehicle cooling fan rotating at the first (higher) speed can be reduced or eliminated due to the flow of cooling air from the fan rotating at the second (slower) speed.

Third, the eddy current drive system of the clutch device may includes permanent magnets that are arranged adjacent to the electrically conductive ring in manner that provides consistent operation and efficient dissipation of heat from the eddy current drive components. For example, the conductive ring can be arranged radially outward from the permanent magnets so that the heat generated by the production of eddy currents in the conductive ring can be dissipated radially outward through a plurality of cooling fins. Also, the conductive ring (and the cooling fins attached thereto) can rotate at the first (higher) speed with the drive pulley during operation, thereby causing the cooling fins to generate increased air movement that enhances the heat dissipation from the conductive ring.

Fourth, the conductive ring of the eddy current drive system can be formed from a generally nonmagnetic material such as aluminum or the like. In such circumstances, the ring is not necessarily attracted or repelled by the magnets during assembly, which reduces the complexity of aligning and assembling components of the clutch device. Furthermore, in those embodiments in which the conductive ring is formed from a nonmagnetic material such as aluminum or the like, the conductive ring may have a lower mass (e.g., compared to some magnetic materials) and more efficient heat dissipation properties.

Fifth, the clutch device can be configured such that the input portion and output portion remain in an assembled state even after the clutch device is removed from the drive pulley. In such circumstances, the input portion and output portion of the clutch device do not necessarily separate when a user attempts to remove the clutch device from the drive pulley. Moreover, components of the eddy current drive system (e.g., the magnet ring and the conductive ring) can be removed from the clutch device while the other components of the clutch device (e.g., the input portion and output portion) remain in the assembled state. Such a configuration permits a user to readily service or replace the components of the eddy current drive system without disassembly of the input portion and output portion of the clutch device.

Some or all of these and other advantages may be provided by the clutch systems described herein.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
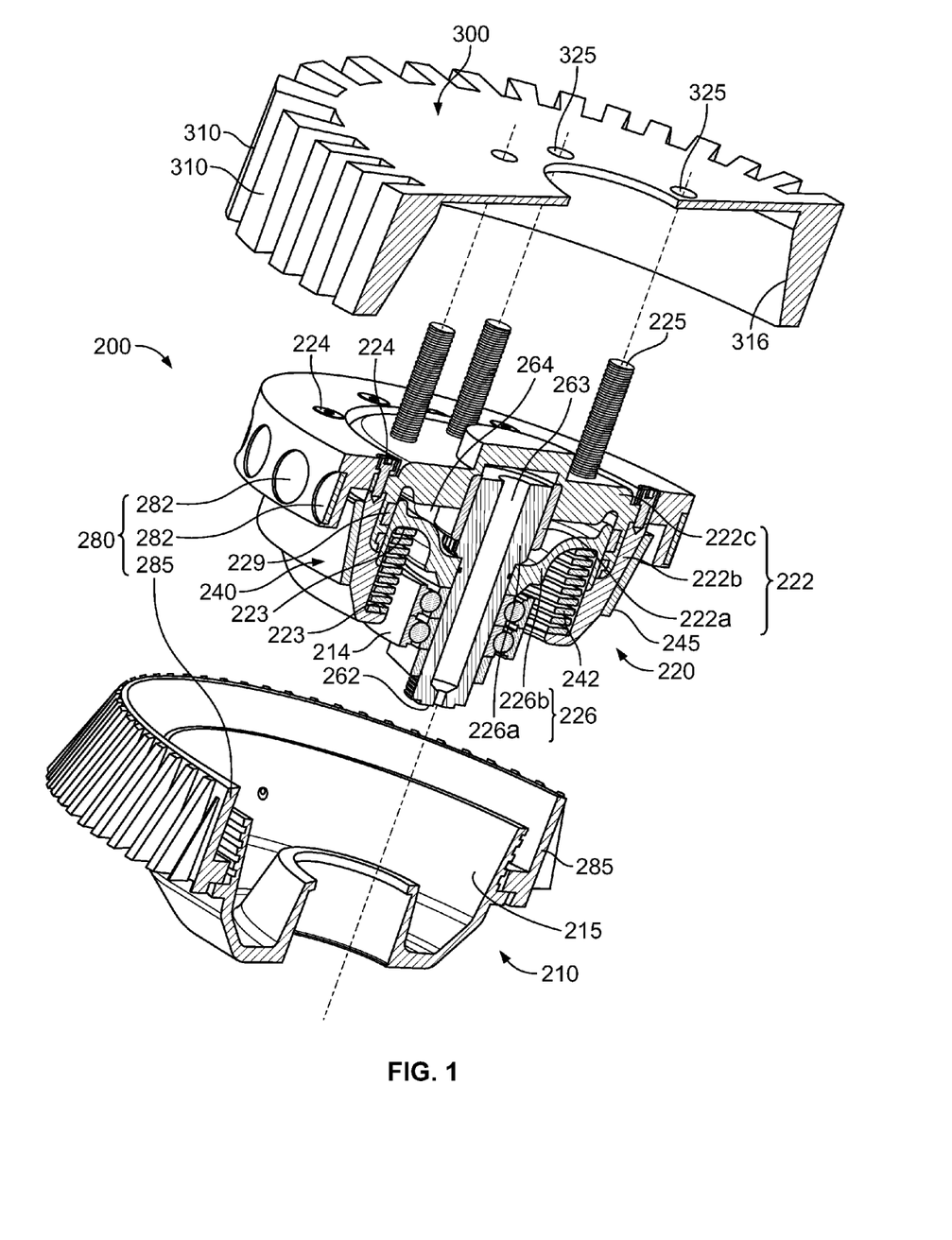
FIG. 1 is a perspective exploded view of a section of a clutch device with a fan blade device, in accordance with some embodiments.
Figure 2:
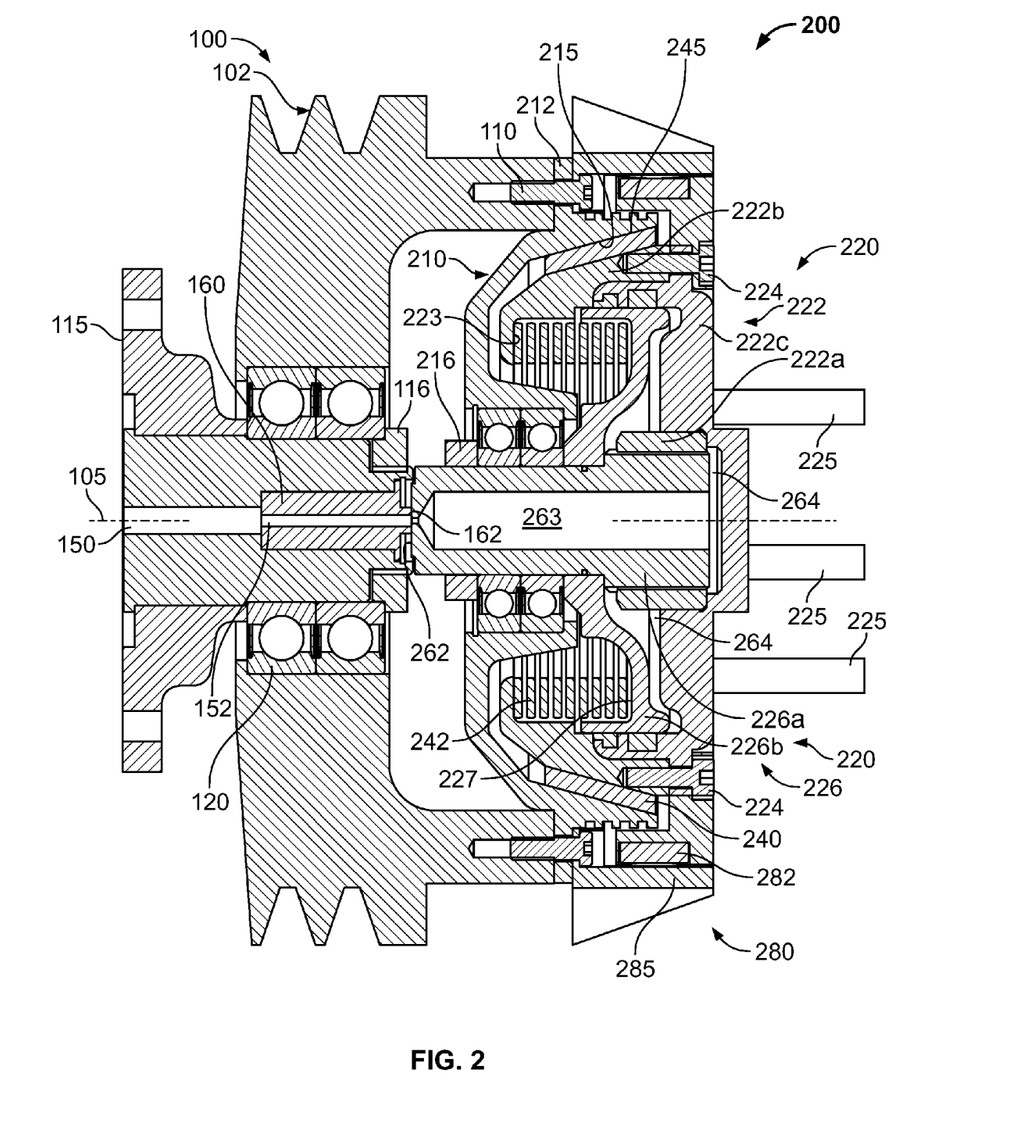
FIG. 2 is a cross-sectional view of a clutch device with an output portion shifted to an engaged position in accordance with some embodiments.
Figure 3:
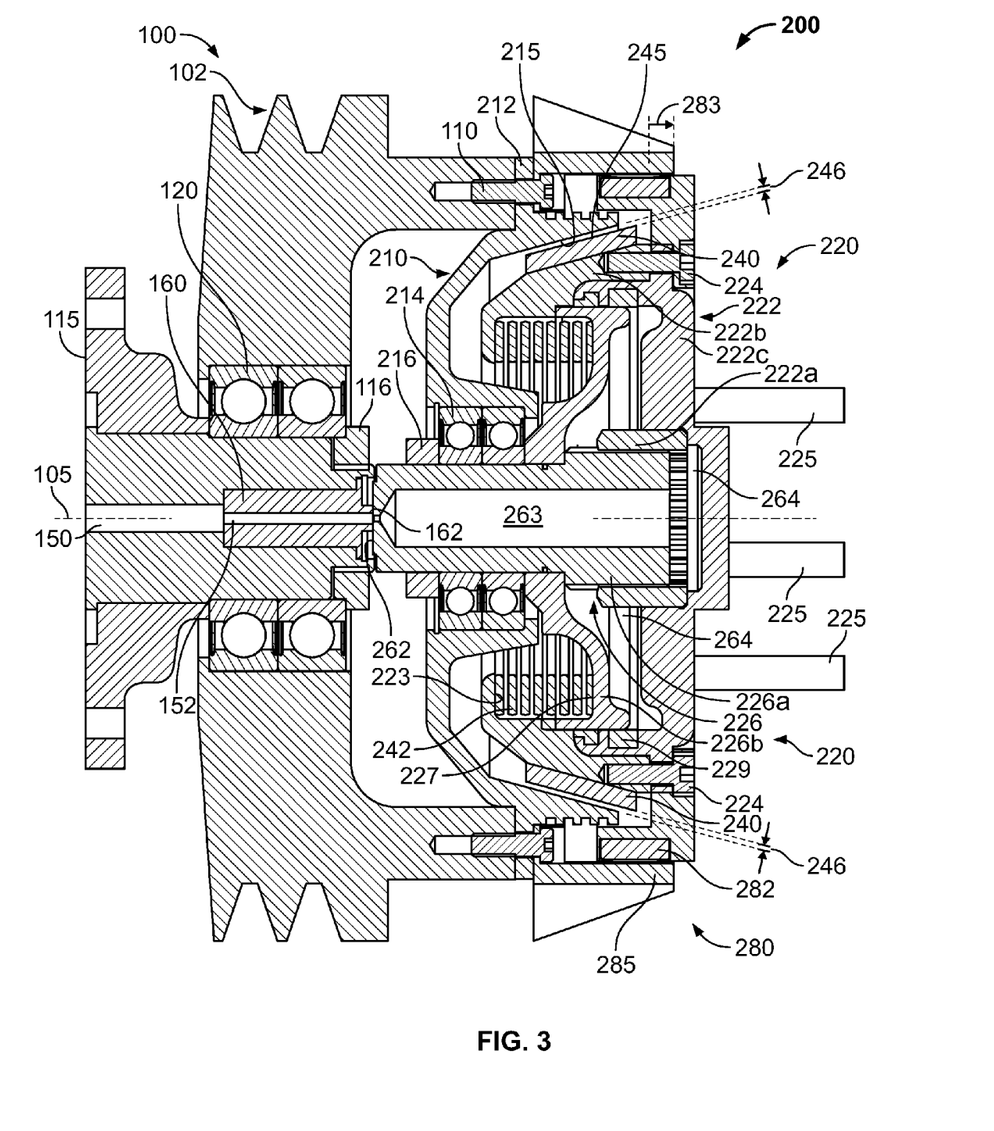
FIG. 3 is a cross-sectional view of the clutch device of FIG. 2 with an output portion shifted to a disengaged position.

Referring to FIGS. 1-3, some embodiments of a clutch device 200 can include a clutch ring 240 that provides rotational output at a first speed and an eddy current drive system 280 that provides rotational output at a second speed (when the clutch friction surfaces are disengaged). In such circumstances, the clutch device 200 can be controlled to provide rotational control, for example, to a cooling fan device 300 (FIG. 1) of an engine cooling system in a vehicle. Accordingly, the cooling fan can be operated at the first speed when the clutch ring 240 engages an opposing friction surface 215 (refer to FIG. 2) to thereby rotate with a drive pulley 100 or other drive source. Furthermore, the cooling fan can be operated at the second speed when the clutch ring 240 disengages the opposing friction surface 215 (refer to gap 246 in FIG. 3) due to the eddy current drive system 280.

Such a multi-speed clutch system can be affective to provide different levels of air flow output from the cooling fan 300. For example, some vehicles may operate with extended periods of idle, such as buses, vocational equipment (e.g., garbage trucks), or construction equipment vehicles, so the cooling system may periodically activate the fan clutch to start rotation of the cooling fan. The high-speed rotation of the fan blades in these vehicles might be noticeably loud to both passengers (inside the vehicle cabin) and pedestrians (outside the vehicle cabin), especially when the vehicle is running at idle. However, the multi-speed clutch device 200 described herein can be implemented within the vehicle cooling systems so that the fan blades are rotated at a second speed even when the cooling system has not activated the clutch device 200 to frictionally engage the clutch ring 240 with the opposing surface 215. The second speed of the cooling fan may be less than the first speed, and thus the noise from the cooling fan may be reduced. Furthermore, the multi-speed clutch device 200 facilitates the flow of cooling air both when the vehicle cooling system activates the fan (e.g., by causing the clutch friction surfaces to engage) and when the vehicle cooling system deactivates the fan (e.g., by causing the clutch friction surfaces to disengage). Thus, the vehicle's engine temperature can be maintained below a threshold level for a greater period of time, which reduces the frequency that clutch device 200 must be activated by the cooling system to rotate the cooling fan at the first (and perhaps louder) speed.

Briefly, in operation, the clutch system may include a drive source such as the drive pulley 100 that is rotated at a first speed due to connection with an engine output shaft via a belt, chain, gear, or the like. (Note that the drive pulley 100 is removed from FIG. 1 for purposes of illustration, but is depicted in FIGS. 2-3.) The clutch device 200 includes an input portion 210 that is directly or indirectly mounted to the drive pulley 100 so as to rotate at the first speed with the drive pulley 100. In this embodiment, the input portion 210 includes an input plate 212 that is directly mounted to the drive pulley 100 via mounting bolts 110 (FIGS. 2-3). The clutch device 200 also includes an output portion 220 that can be actuated to engage or disengage with the input portion 210. For example, the output portion 220 can include a piston 222 that is adjustable relative to the input portion 210 so as to shift the clutch ring 240 into engagement (FIG. 2) or disengagement (FIG. 3, refer to the disengagement gap 246) with the opposing friction surface 215 on the input portion 210. When the piston 222 is adjusted to shift the clutch ring 240 to the engaged position (FIG. 2), the output portion 220 is urged to rotate at the first speed with the input portion 210 and the drive pulley 100. The clutch device 200 also includes the eddy current drive system 280 that urges the output portion 220 to rotate at a second speed different from the first speed when the piston 222 shifts the clutch ring 240 to the disengaged position (FIG. 3). In this embodiment, the eddy current drive system 280 includes a set of permanent magnets 282 arranged along an outer circumference of the output portion 220. The eddy current drive system 280 also includes an electrically conductive ring 285 coupled to input plate 212 so that a radial gap 288 (shown in FIG. 6) is defined between the permanent magnets 282 and the ring 285. Accordingly, when the clutch ring 240 is disengaged (refer to FIG. 3), the permanent magnets 282 mounted to the output portion 220 can move relative to the ring 285. It is believed that such relative movement causes eddy currents to be produced in the electrically conductive ring 285, which produces a force between the ring 285 and the magnets 282. Because the ring 285 is rotated at the first speed along with the input plate 212, the force acts upon the permanent magnets 282 to thereby drive the output portion 220 to rotate at the second speed (which may be less than the first speed).

As shown in FIGS. 2-3, in this embodiment the drive pulley 100 is rotatably coupled to a support shaft 115 by one or more bearings 120. A nut or collar device 116 is secured to the support shaft 115 and is abutted to the bearing 120 so that the bearings 120 remain substantially fixed in the axial direction relative to the support shaft 115. The drive pulley 100 receives a belt, chain, gear or the like in order to force the drive pulley 100 to rotate in a particular direction about an axis 105. In this embodiment, the support shaft 115 is substantially stationary, and the drive pulley 100 includes a belt engagement surface 102. Rotational power from a vehicle motor or the like may be transmitted through a belt (not shown in FIGS. 2-3) to the belt engagement surface 102, thereby urging the drive pulley 100 to rotate about the central axis 105 of the support shaft 115.

A fluid supply input 150 extends into the support member 115 for connection to a fluid supply reservoir (not shown in FIGS. 2-3). A supply channel 152 extends from the fluid supply input 150 in a substantially axial direction along the central axis 105. In this embodiment, the supply channel 152 extends through a cylindrical outlet 160, which has a mating end 162 to mate with a face seal 262 of the clutch device 200. As such, when the clutch device 200 is mounted to the drive member 100, the mating end 162 is pressed against the face seal 262 to form a mechanical seal. A fluid channel 263 extending axially through the face seal 262 is substantially axially aligned with the central axis 105. Accordingly, the fluid may be transmitted from the fluid supply input 150, through the supply channel 152 and the fluid channel 263, and into the fluid-receiving chamber 264 of the clutch device 200. In some embodiments, the mating end 162, the face seal 262, or both may comprise metals, polymers, or composite materials that can substantially maintain the mechanical seal therebetween while the clutch device 200 is selectively rotated relative to the support shaft 115. The fluid transmitted to the fluid-receiving chamber 264 of the clutch device 200 may be any suitable liquid or gas, as described in more detail below. Such fluids may be received, for example, from a pneumatic air supply system or a hydraulic oil supply system.

Referring again to FIG. 1 and to FIGS. 2-3, in this embodiment, the output portion 220 of the clutch device 200 includes piston 222 and a hub 226. The piston 222 includes a first spline member 222a, a spring engaging member 222b, and a mounting plate 222c that are assembled together. Likewise, the hub 226 includes a second spline member 226a, a spring engaging plate 226b that are assembled together. The piston 222 is movable in an axial direction relative to the hub 226 and is substantially stationary in a rotation direction relative to the hub 226. In this embodiment, the motion of the piston 222 relative to the hub 226 is accomplished by way of a spline connection between the first spline member 222a and the second spline member 226a. In other embodiments, the motion of the piston 222 relative to the hub 226 may be accomplished using one or more bushings that permit relative axial movement and anti-rotation dowels that substantially prevent relative rotation between the piston 222 and the hub 226.

In the embodiment depicted in FIGS. 1-3, the mounting plate 222c of the piston 222 is configured to receive an output instrument (e.g., a fan blade device 300 depicted in FIG. 1 or another instrument to be rotated). In particular, the mounting plate 222c may include studs 225 that are configured to receive the output instrument. As shown in FIG. 1, the fan blade device 300 can be configured to fit over the output portion 220. The fan blade device 300 can include a plurality of fan blade structures 310 that are arranged to generate air flow, for example, as part of a vehicle's engine cooling system. The fan blade structures 310 can be angled, tapered, curved, or otherwise configured to direct the output of air flow. In this embodiment, the fan blade device 300 includes mounting holes 325 that are configured to receive the studs 225 extending from the clutch device 200. In alternative embodiments, the output portion 220 of the clutch device 200 may be configured to receive an output instrument other than a fan blade device 300. For example, the mounting plate 222c may be configured to connect with other components that are to be selectively rotated, such as output shafts, gears, brake systems, and the like.

As previously described, in this embodiment the mounting plate 222c can be assembled together with the first spline member 222a and the spring engaging member 222b to form the piston 222. The spring-engaging member 222b of the piston 222 has a radially extending surface 223 that abuts with a spring 242. The spring-engaging member 222b is fixedly coupled to the mounting plate 222c, for example, by bolts 224 screwed into threaded cavities. The first spline member 222a is fixedly coupled to the mounting plate 222c, for example, by threads on an external surface of the first spline member 222a that are mated into a threaded cavity of the mounting plate 222c. Accordingly, the piston components 222a, 222b, and 222c can collectively move relative to the hub 226 (e.g., shift axial positions relative to the hub 226 in this embodiment).

Still referring to FIGS. 1-3, the hub 226 includes the second spline member 226a assembled together with the spring engaging plate 226b. The second spline member 226a can be fixedly coupled to the spring engaging plate 226b, for example, by threads on an external surface of the second spline member 226a that are mated into a threaded cavity of the spring engaging plate 226b. The second spline member 226a at least partially defines the fluid channel 263 extending from the face seal 262 to the chamber 264. At least one bearing 214 is disposed between the 226 and the input plate 212. As previously described, the input plate 212 is secured to the drive pulley 100 and rotates along with the drive pulley 100. As such, the bearings 214 permit the hub 226 (including the second spline member 226a and the spring engaging plate 226b) to rotate relative of the input plate 212 and the drive pulley 100. In this embodiment, the bearings 214 are disposed along an outer circumferential surface 241 of the second spline member 226a. The bearing 214 may be secured to the second spline member 226a and the input plate 212 using any number of securing means, such as collar devices, locking nuts, locking rings, tongue and groove arrangements, or the like. In this embodiment, the bearings 214 are secured to the hub 226 using a locking nut 216 so that the bearings 214 remain substantially stationary relative to the hub 226 in the axial direction. The bearings 214 are secured to the input plate 212 using a locking ring such that the bearings 214 remain substantially stationary relative to the input plate 212 in the axial direction. Therefore, in this embodiment, the hub 226 may rotate independently of the input plate 212 and drive pulley 100, but the hub 226 remains substantially stationary in the axial direction relative to the input plate 212 and drive pulley 100.

Still referring to FIGS. 1-3, the spring 242 is arranged between the piston 222 and the hub 226 so as to bias the piston 222 toward one of a first position and second position relative to the hub. In this embodiment, the spring 242 is a single, coiled spring that has an inner and outer diameter to fit securely between the spring-engaging member 222b of the piston 222 and the spring-engaging member 222b of the hub 226b. Using only a single spring may simplify assembly and disassembly of the clutch device 200 during manufacture or repair. Because only one spring 242 need be arranged between spring-engaging members 222b and 226b, less time is required to properly align the spring 242 during assembly. Alternatively, other embodiments may use a more complex arrangement having a greater number of smaller springs that are positioned adjacent one another between spring-engaging members 222b and 226b.

When the clutch device 200 is assembled to the drive pulley 200 as shown in FIGS. 2-3, the spring 242 is compressed between the spring-engaging surface 222b of the piston 222 and the spring engaging surface 226b of the hub 226. Such an arrangement urges the piston 222 in an axial direction toward the drive pulley 100. Thus, in this embodiment, the spring 242 biases the piston 222 such that an engagement surface 245 of the output portion 220 is urged against an opposing surface 215 of the input plate 212, which is mounted to the drive pulley 100 using the bolts 110. In particular, the clutch ring 240 is mounted to the piston 222 so that the engagement surface 245 of the clutch ring 240 is adjacent to the opposing friction surface 215 of the input plate 212. When the engagement surface 245 presses against the opposing friction surface 215, the output portion 220 engages the input portion 210, and the output portion 220 thereby rotates at the first speed with the drive pulley 100.

As shown in FIGS. 2-3, some embodiments of the clutch ring 240 may include an engagement surface 245 that at least partially extends in a nonradial direction. For example, the clutch ring 240 may include a frusto-conical interface between the clutch surfaces (e.g., the engagement surface 245 and opposing friction surface 215). In such circumstances, the frusto-conical clutch ring 240 may have an increasingly larger radius as the engagement surface 245 extends away from the drive pulley 100 when the clutch device 200 is mounted to the drive pulley 100. The clutch ring 240 may comprises a metallic, ceramic or other material that is capable of providing frictional engagement and is capable of dissipating heat generated at the frictional interface. For example, some embodiments of the clutch ring 240 may comprise a material having a static coefficient or friction in the range of approximately 0.2 to approximately 0.6 and, in particular embodiments, may comprises a material having a static coefficient of friction in the range of approximately 0.4 to approximately 0.5.

The shape and orientation of the frusto-conical clutch ring 240 and the complementary friction surface 215 may provide the clutch device 200 with a conical wedging action. This conical wedging action may improve the engagement friction, thereby providing an increase in the torque transfer capabilities. For example, some embodiments of the clutch device 200 may provide torque ratings of approximately 2700 in-lbs, 2800 in-lbs, 2900 in-lbs, 3000 in-lbs, or more, and particular embodiments may provide torque ratings in the range of approximately 3000 in-lbs to approximately 5000 in-lbs. The substantial torque transfer capabilities may be caused by a number of factors, such as the coefficient of friction of the clutch ring 240, the conical angle of the clutch ring 240, the force of the spring 242, and other factors affect the torque rating of the clutch device 200.

Referring more closely to FIG. 3, the output portion 220 of the clutch device 200 may disengage the input portion 210 when fluid is introduced into the chamber 264 under sufficient pressure to axially shift the piston 222 relative to the hub 226. When the engagement surface 245 is shifted away from the opposing surface 215, the output portion 220 (including the piston 222 and hub 226 in this embodiment) is no longer driven to rotate at the first speed due to the direct engagement with the input plate 212. Instead, as described in more detail below in connection with FIGS. 4-8, the eddy current drive system 280 of the clutch device causes the output portion 220 to rotate at a second speed that is different from the first speed. As previously described, fluid may enter the chamber 264 through the fluid channel 263. In this embodiment, the fluid-receiving chamber 264 is at least partially defined by the space between the mounting plate 222c of the piston 222 and the hub 226. When a predetermined amount of fluid pressure has built up in the chamber 264, the piston 222 is forced in an axial forward direction away from the drive pulley 100, thus overcoming the bias of the spring 242 that urges the piston 222 toward the drive pulley 100.

As shown in FIG. 3, when the engagement surface 245 of the output portion 220 is shifted away from the opposing friction surface 215 on the input portion 210, a gap 246 is created between the engagement surface 245 of and the opposing friction surface 215. It should be understood that the gap 246 depicted in FIG. 2 (and in FIGS. 6 and 8) is exaggerated for purposes of illustration. The gap 246 can be sufficient to eliminate contact between the clutch ring 240 and the opposing friction surface 215. In such circumstances, the output portion 220 (including the piston 222 and hub 226 in this embodiment) is longer driven to rotate by direct engagement with the input plate 212. When the piston 222 is shifted to the disengaged position depicted in FIG. 3, the output portion 220 (including the piston 222 and hub 226 in this embodiment) can rotate relative to the input plate 210 and drive pulley 100 due to the bearing connection 214. Accordingly, the output portion 220 may rotate at the second speed even though the drive pulley 100 continues to rotate at the first speed.

As previously described, the gap 246 between the engagement surface 245 of and the opposing friction surface 215 is created when a fluid under sufficient pressure is received in the chamber 264. If force from the fluid pressure in the chamber 264 is sufficient to overcome the bias force of the spring 242, the piston 222 is shifted forward in the axial direction. In some embodiments, the fluid pressure that is required to overcome the spring force may be approximately predetermined from the spring constant, the desired gap 246, the dimensions of the chamber 264, and other such factors. As previously described, the fluid supply input 150 receives the fluid from the reservoir (not shown in FIGS. 1-2). The fluid passes through the fluid supply channel 152, through the face seal 262, through the fluid channel 263, and into the chamber 264. The mechanical seal at the face seal 262 permits the fluid to properly reach the chamber 264.

Still referring to FIG. 3, the fluid in the chamber 264 may have only one possible leak path, which is along the outer circumferential surface of the spring-engaging member 226b. A seal 229 is disposed along the periphery of the leak path between the circumferential surface 249 of the hub 242 and the output member 220. The seal 229 is positioned as such to prevent fluid leakage through the leak path. Thus, a fluid leak may be quickly detected and repaired by checking the seal 229 and by checking the mechanical seal at the face seal 262. By reducing the number of seals in the clutch device design, the time and cost associated with detecting which seal is faulty may be significantly reduced. As previously described, the piston 222 remains rotationally stationary relative to the hub 226 in this embodiment, so the seal 229 does not endure a relative rotational motion. When the seal 229 is internal to the clutch device 200 and is limited to such minimal sliding motion, the possibility of contaminants entering the chamber 264 through the seal 229 may be significantly reduced. Such a reduction is contamination may increase the longevity the clutch device 200 and may reduce the need for repair or replacement.

Referring again to FIGS. 1-3, the piston 222 in this embodiment serves as both the component that shifts to engage the input plate 212 and drive pulley 100 (via the clutch ring 240) and the component that receives an output instrument (such as the fan blade device 300 depicted in FIG. 3). The output instrument mounted to the studs 225 of the piston 222 may also be shifted in the axial direction as the piston 222 is actuated, but the displacement in the axial direction may be relatively small such that this shifting motion has little or no impact on the output instrument. Similarly, the displacement in the axial direction may be relatively small such that the shifting motion of the piston 222 relative to the hub 226 has little or no impact on the longevity and performance of the seal 229.

Figure 4:
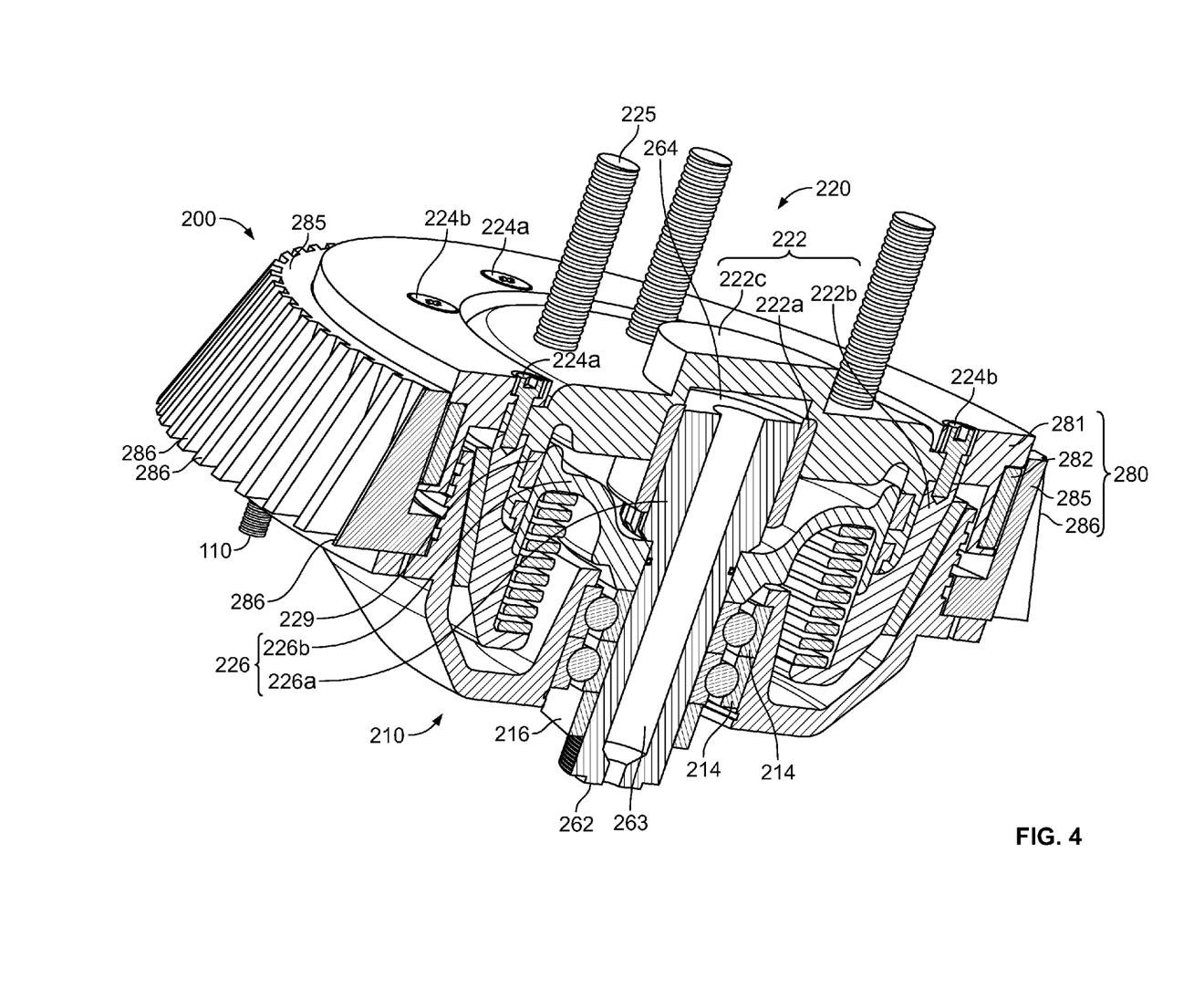
FIG. 4 is a perspective view of the clutch device in accordance with some embodiments.
Figure 5:
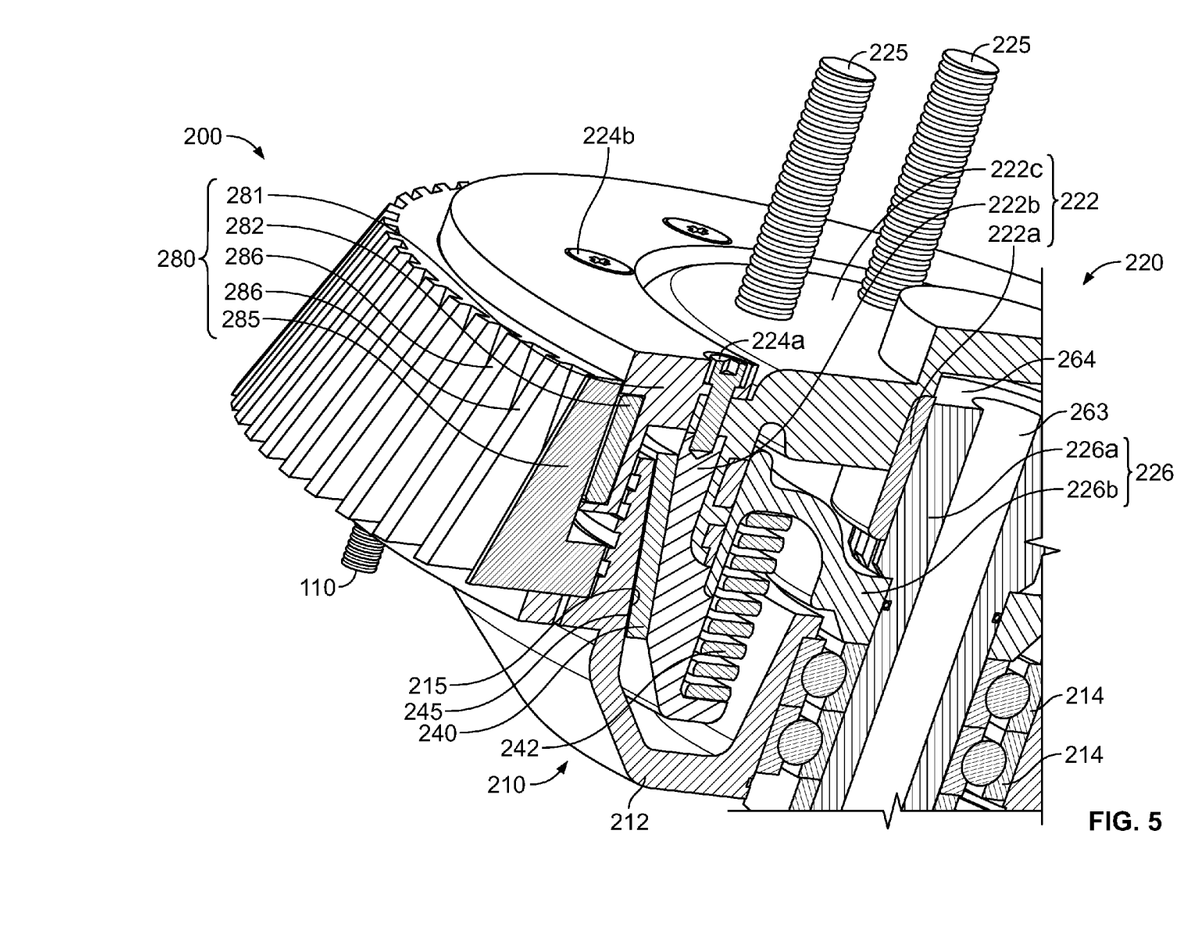
FIG. 5 is a perspective view of a portion of the clutch device of FIG. 4.
Figure 6:
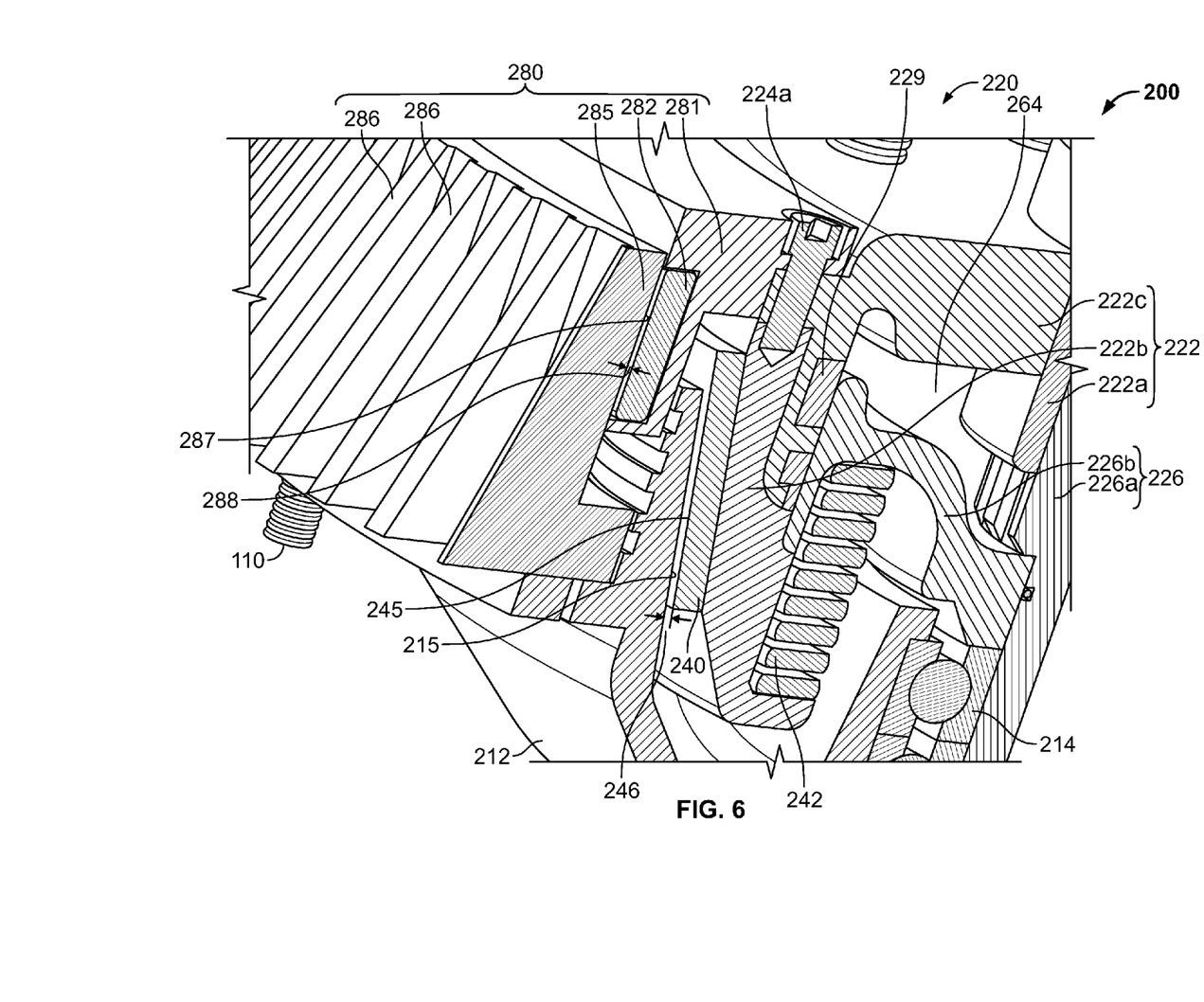
FIG. 6 is a perspective view of a portion of the clutch device of FIG. 5.

Referring now to FIGS. 4-6, the eddy current drive system 280 can operate as a secondary drive component that urges the output portion 220 to rotate at a second speed when the output portion 220 is disengaged from the input portion 210. As previously described, the eddy current drive system 280 includes the permanent magnets 282 that are arranged adjacent to the electrically conductive ring 285. In some embodiments, the magnets 282 and ring 285 can be arranged in manner that provides consistent operation and efficient dissipation of heat from the eddy current drive components. Moreover, some embodiments of the ring 285 can be formed from a generally nonmagnetic, electrically conductive material such as aluminum or the like. Thus, the ring 285 is not necessarily attracted or repelled by the magnets 282 during assembly, which reduces the complexity of manufacturing and repairing the clutch device. Furthermore, in those embodiments in which the conductive ring 285 is formed from aluminum, the ring 285 may have a lower mass (e.g., compared to some magnetic materials), efficient heat dissipation properties, and reduced manufacturing complexities.

The permanent magnets 282 can be carried in a magnet ring 281 so that the magnets 282 are oriented to face radially outward along a circumferential surface. In such circumstances, the electrically conductive ring 285 may be arranged radially outward of the magnets 282 so that an inner circumferential surface 287 (FIG. 6) of the ring 285 is adjacent to the magnets 282. Accordingly, a radial gap 288 (FIG. 6) is defined between the magnets 282 and the inner circumferential surface 287 of the conductive ring 285. The gap 288 is configured to be large enough so as to avoid frictional contact between the magnets 282 and the ring 285. Also, the radial gap 288 is configured to be small enough so that relative movement between the magnets 282 and the ring 285 induces the formation of eddy currents in the conductive material of the ring 285. For example, in this embodiment, the radial gap 288 between the magnets 282 and the ring 285 is about 0.25 inches or less, about 0.005 inches to about 0.100 inches, and preferably about 0.020 inches. It is believed that the eddy currents are formed in the conductive ring 285 in response to relative motion of the magnets 282 because a moving magnetic field intersects a conductor (e.g., the conductive ring 285). The relative motion may cause a circulating flow of electrons, or current, within the conductive material of the ring 285. These circulating eddies of current temporarily create electromagnets with magnetic fields that oppose the effect of the applied magnetic field (from the magnets 282). Accordingly, the eddy current drive system 280 can create a force that urges the output portion 220 to rotate at a second speed that is different from the first rotational speed of the input portion and the drive pulley 100 (drive pulley 100 is shown in FIGS. 2-3).

Still referring to FIGS. 4-6, in some embodiments, the conductive ring 285 can be coupled to the input potion 210 while the permanent magnets 282 are coupled to the output portion 220. For example, the conductive ring 285 may include a flange that is engaged by some or all of the mounting bolts 110 (FIGS. 2-3) that join the input plate 212 with the drive pulley 100. In such circumstances, the conductive ring 285 can be urged to rotate at the first speed along with the input portion 210 and the drive pulley 100. The permanent magnets 282 are mounted into the magnet ring 281, which includes a flange that is retained by a subgroup 224a of the assembly bolts 224. (As described below in connection with FIG. 9, another subgroup 224b of the assembly bolts engage the piston 222 without engaging the magnet ring 281.) Accordingly, when the eddy current drive system 280 urges the permanent magnets 282 to move in response to the eddy currents generated in the ring 285, the components of the output portion 220 are also urged to move in a similar manner.

The configuration in which the conductive ring 285 is coupled with the input portion 210 (to rotate with the drive pulley 100) can provide improved heat dissipation characteristics for the eddy current drive system 280. In particular, the eddy current drive system 280 can generate heat within the conductive ring 285 due to the production of the eddy currents within the conductive material. The heat in the conductive ring 285 can be dissipated by air flow passing over the conductive ring 285. Because the ring 285 is arranged on the input portion 210 of the clutch device 200, the ring 285 rotates at the first speed with the drive pulley 100—both when the clutch ring 240 is engaged and disengaged. As such, in this embodiment, the conductive ring 285 is provided with a greater opportunity to dissipate heat to the surrounding air because it is arranged on the input portion 210 and radially outward from the magnet ring 281.

In addition, some embodiments of the conductive ring 285 can be equipped with a plurality of cooling fins 286 extending radially outward (e.g., opposite from the inner circumferential surface adjacent to the permanent magnets 282). The cooling fins 286 can provide even greater heat dissipation characteristics for the eddy current drive system 280. For example, the heat generated by the production of eddy currents in the conductive ring 285 can be dissipated radially outward through the cooling fins 286 and to the surrounding air. Also, the conductive ring 285 is coupled to the input portion 210 and thereby rotates at the first speed with the drive pulley 100 during operation. Therefore, the cooling fins 286 rotate with the ring 285 and generate increased air movement that enhances the heat dissipation from the ring 285.

Still referring to FIGS. 4-6, the cooling fins 286 of the conductive ring 285 can be configured to have a tapered shape. In particular, the cooling fins 286 can be smaller in size at the end near the mounting plate 222c (e.g., the part that receives the fan blade device 300 or other instrument) and larger in size at the end near the input plate 212. The tapered configuration of the cooling fins 286 can facilitate assembly of the fan blade device 300 or other instrument onto the studs 225 of the mounting plate 222c. For example, as shown in FIG. 1, the fan blade device 300 can include an inner tapered surface 316 that can fit over the cooling fins 286 of the conductive ring 285 as the fan blade device 300 is mounted to the output portion 220. The cooling fins 286 and the tapered surface 316 of the fan blade device 300 can be sufficiently spaced after assembly so that air is permitted to pass over the cooling fins 286 during operation. It should be understood that, in other embodiments, the cooling fins 285 of the conductive ring 285 can have other configurations such as straight and nontapered fins, curved fins, or the like.

As previously described, some embodiments of the conductive ring may be formed from a generally nonmagnetic material, such as aluminum. In these embodiments, the generally nonmagnetic material of the ring 285 is electrically conductive so as to produce the eddy currents when exposed to relative motion with the permanent magnets 282. The aluminum or other nonmagnetic material of the ring 285 can facilitate assembly or disassembly of the clutch device 200 (e.g., during repair). For example, the magnets 282 are not necessarily attracted to (or repelled from) the ring 285 during assembly, which reduces the complexity of manufacturing and repairing the clutch device 200. During assembly, the magnet ring 281 with the permanent magnets 285 may be inserted to a position that aligns with the mounting holes for the bolts 224a. In such circumstances, the permanent magnets 282 are positioned adjacent to the conductive ring 285. If the conductive ring 285 was formed from steel or another magnetic flux conductive material, the alignment of the magnetic ring 281 may be more complex due to the magnetic forces that could urge the magnet ring 281 to a non-aligned position. However, in this embodiment, the conductive ring 285 is formed from a generally nonmagnetic material such as aluminum, and thus the magnet ring 281 can be readily aligned with the mounting holes during assembly without magnetic force interference from the conductive ring 285.

Moreover, in those embodiments in which the conductive ring 285 is formed from aluminum or another generally nonmagnetic material, the ring 285 can have a relatively low mass (e.g., compared to steel or other magnetic materials), efficient heat dissipation properties, and reduced manufacturing complexities. For example, the conductive ring 285 formed from aluminum can have greater thermal conductivity than steel or other magnetic materials. As such, the aluminum material in the ring 285 can enhance the heat dissipation characteristics of the eddy current drive system 280. Also, the conductive ring 285 formed from aluminum can have a lower mass (and rotational inertia) than other magnetic materials that have a greater material density. Finally, the conductive ring 285 formed from aluminum can be manufactured in a cost-efficient manner that does not necessarily require complex lamination techniques or embedded magnetic materials.

Referring to FIG. 6, the eddy current drive system 280 is configured so that the gap 288 is defined between the permanent magnets 282 and the conductive ring 285. As previously described, the gap 288 may be radially outward of the permanent magnets 282 and may be small enough so that eddy currents are produced in the conductive ring 285 during relative motion between the ring 285 and the magnets 282. In such embodiments, the clutch device 200 can be configured to maintain the radial gap 288 at a generally constant dimension even when the piston 222 is axially shifted relative to the input plate 212. For example, the permanent magnets 282 are carried in the magnet ring 281, which is assembled to the piston 222. As previously described, the piston 222 can be axially shifted relative to the input plate 212 when sufficient fluid pressure is introduced into the chamber 264. Such axial movement of the piston 222 causes the clutch ring 240 to disengaged the opposing frictional surface 215 (refer to gap 246 shown in FIG. 6). In this embodiment, however, the radial gap 288 between the magnets 282 and the conductive ring 285) is not changed by the axial motion of the piston 222 (and the axial motion of the magnet ring 281 assembled to the piston 222). Accordingly, the magnet ring 281 and the permanent magnets 282 may shift axially along with the piston 222 (refer to displacement 283 shown in FIG. 3), but the gap 288 between magnets 282 and the conductive ring 285 can remain substantially constant. In such circumstances, the eddy current drive system 280 can provide consistent operation during operation even if the piston 222 causes a relative axial displacement 283 (FIG. 3) between the ring 285 and the magnets 282. (Note that the disengagement gap 246 and the displacement distance 283 (FIG. 3) are exaggerated in the drawings for purposes of illustration.)

Figure 7:
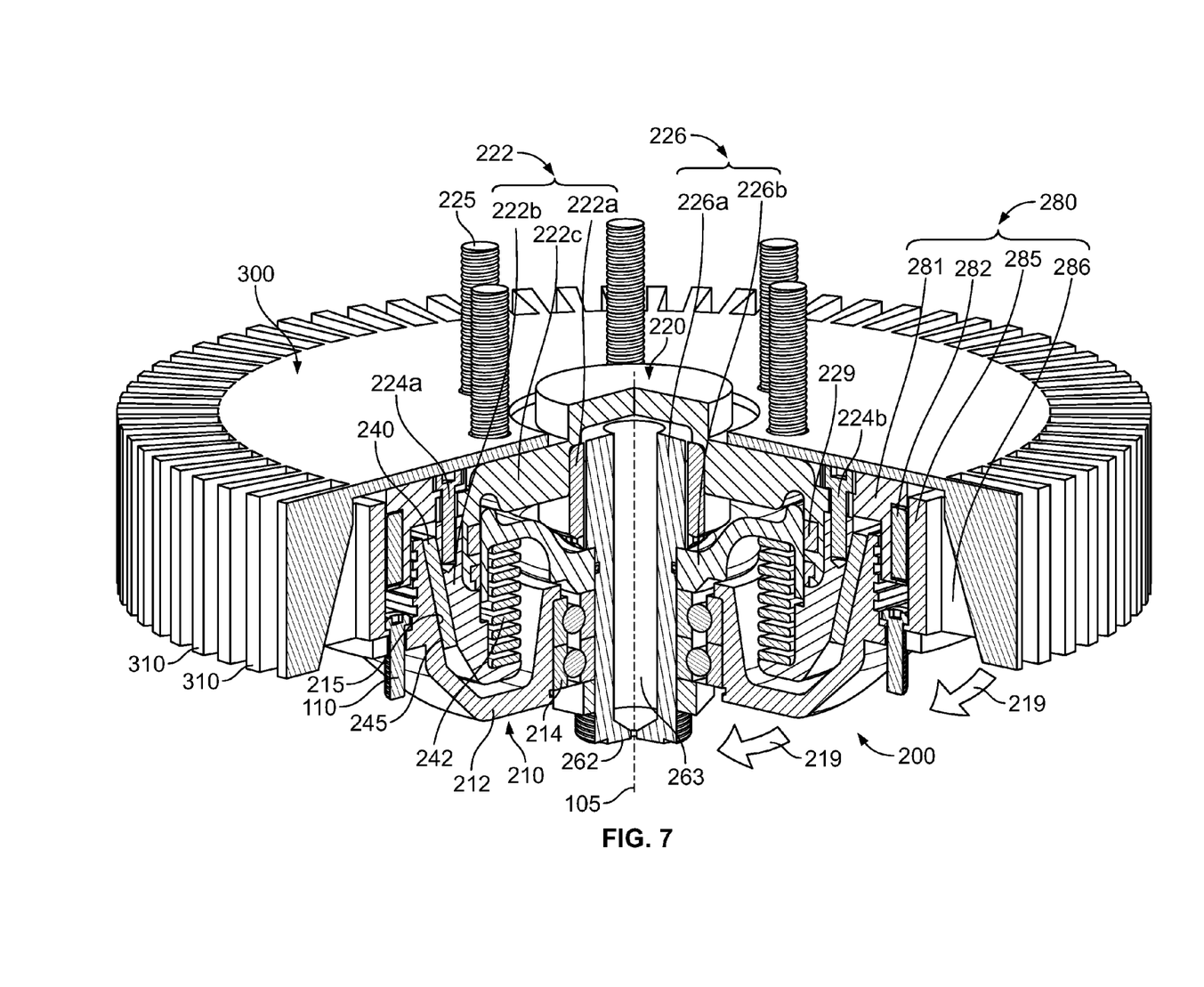
FIG. 7 is a perspective section view of a clutch device with a fan blade device driven to rotate at a first speed, in accordance with some embodiments.
Figure 8:
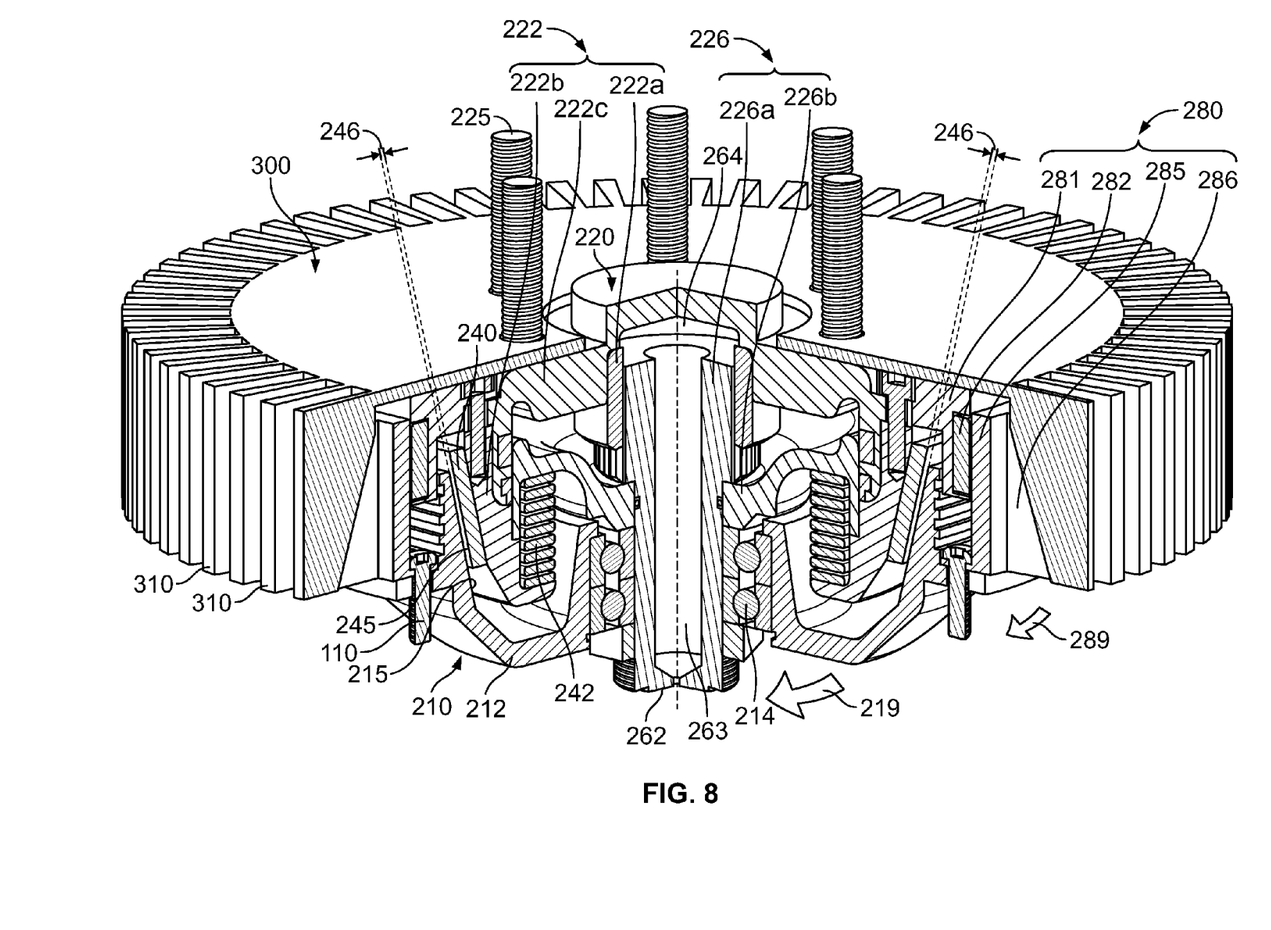
FIG. 8 is a perspective section view of the clutch device of FIG. 7 with the fan blade device driven to rotate at a second speed.

Referring now to FIGS. 7-8, in operation the clutch device 200 can be controlled to rotate the output portion 220 at the first speed 219 (FIG. 7) along with the drive pulley 100 or to rotate the output portion 220 at a second speed 289 (FIG. 8) that is different from the first speed 219. As previously described, the clutch device 200 can be directly or indirectly mounted to the drive pulley 100 that is rotated at the first speed 219 due to connection with an engine output shaft via a belt, chain, gear, or the like. (The drive pulley 100 is removed from FIGS. 7-8 for purposes of illustration, but is depicted in FIGS. 2-3.) In this embodiment, the input portion 210 of the clutch device 200 includes the input plate 212 that is directly mounted to the drive pulley 100 via the bolts 110. Accordingly, the input portion 210 of the clutch device 200 is urged to rotate at the first speed 219 both when the output portion 220 is engaged (FIG. 7) and disengaged (FIG. 8).

As shown in FIG. 7, the output portion 220 of the clutch device 200 can be actuated to engage with the input portion 210, which results in the output portion 220 being rotated at the first speed 219 along with the input portion 210 and the drive pulley 100. As previously described, the output portion 220 includes the piston 222 that is adjustable relative to the input plate 212 so as to shift the clutch ring 240 into engagement with the opposing friction surface 215 on the input plate 212. Accordingly, the frictional engagement between the clutch ring 240 and the opposing surface 215 creates a secure force transmission between the input portion 210 (rotating at the first speed 219) and the output portion 220 (thereby driven to rotate at the first speed 219). When the fan blade device 300 is assembled to the studs 225 of the output portion 220, the fan blades 310 are also driven at the first speed 219 (refer to FIG. 7).

As shown in FIG. 8, when the piston 222 is adjusted to shift the clutch ring 240 to the disengaged position, the output portion 220 is urged by the eddy current drive system 280 to rotate at the second speed 289 that (in this embodiment) is less than the first speed but greater than zero. As previously described in connection with FIG. 3, the output portion 220 of the clutch device 200 can disengage the input portion 210 when fluid is introduced into the chamber 264 under sufficient pressure to axially shift the piston 222. In particular, pressurized fluid may enter the chamber 264 through the fluid channel 263. In this embodiment, the fluid-receiving chamber 264 is at least partially defined by the space between the mounting plate 222c of the piston 222 and the hub 226. When a predetermined amount of fluid pressure has built up in the chamber 264, the piston 222 is forced in an axial forward direction away from the drive pulley 100, thus overcoming the bias of the spring 242 that urges the piston 222 toward the drive pulley 100. When the engagement surface 245 of the clutch ring 240 is shifted away from the opposing friction surface 215 on the input portion 210, the disengagement gap 246 is created between the engagement surface 245 of and the opposing friction surface 215. The gap 246 can be sufficient to eliminate contact between the clutch ring 240 and the opposing friction surface 215. In such circumstances, the output portion 220 (including the piston 222 and hub 226 in this embodiment) is longer driven to rotate at the first speed 219 by direct frictional engagement with the input portion 210. Instead, the output portion 220 is driven to rotate at a second, lesser speed 289 due to the eddy current drive system 280.

Still referring to FIG. 8, the eddy current drive system 280 includes the previously described magnets 282 arranged adjacent to the electrically conductive ring 285. In this embodiment, the permanent magnets 282 are mounted on a magnet ring 281 and are oriented radially outward so that the inner circumferential surface 287 (FIG. 6) of the ring 285 is adjacent to the magnets 282. The radial gap 288 (FIG. 6) defined between the magnets 282 and the conductive ring 285 is configure to be large enough so as to avoid frictional contact between the magnets 282 and the ring 285 and is configured to be small enough so that relative movement between the magnets 282 and the ring 285 induces the formation of eddy currents in the conductive material of the ring 285. As previously described, it is believed that the eddy currents are formed in the conductive ring 285 in response to relative motion of the magnets 282 because a moving magnetic field intersects the conductive ring 285. The circulating eddies of current can temporarily create electromagnets with magnetic fields that oppose the effect of the applied magnetic field (from the permanent magnets 282). Accordingly, the eddy current drive system 280 can create a force that urges the output portion 220 to rotate at the second speed 289 when the input portion 210 is rotated with drive pulley 100 at the first, larger speed 219.

Such embodiments of the clutch device 200 can be useful, for example, to control the rotation of a cooling fan in a vehicle cooling system. For example, as shown in FIGS. 7-8, the fan blade device 300 can be assembled to the output potion 220 of the clutch device 200 so that the fan blades 310 rotate along with the output portion 220. In such circumstances, the fan blades can be driven to rotate at the first speed 219 due to rotational interconnection with the input portion 210 and the drive pulley 100 (refer to FIG. 7) and to rotate at the second speed 289 when the output portion 220 is frictionally disengaged from the input portion 210 (refer to FIG. 8). Thus, the clutch device 200 can be configured as a fan clutch that facilitates the flow of cooling air at two different speeds.

Figure 9:
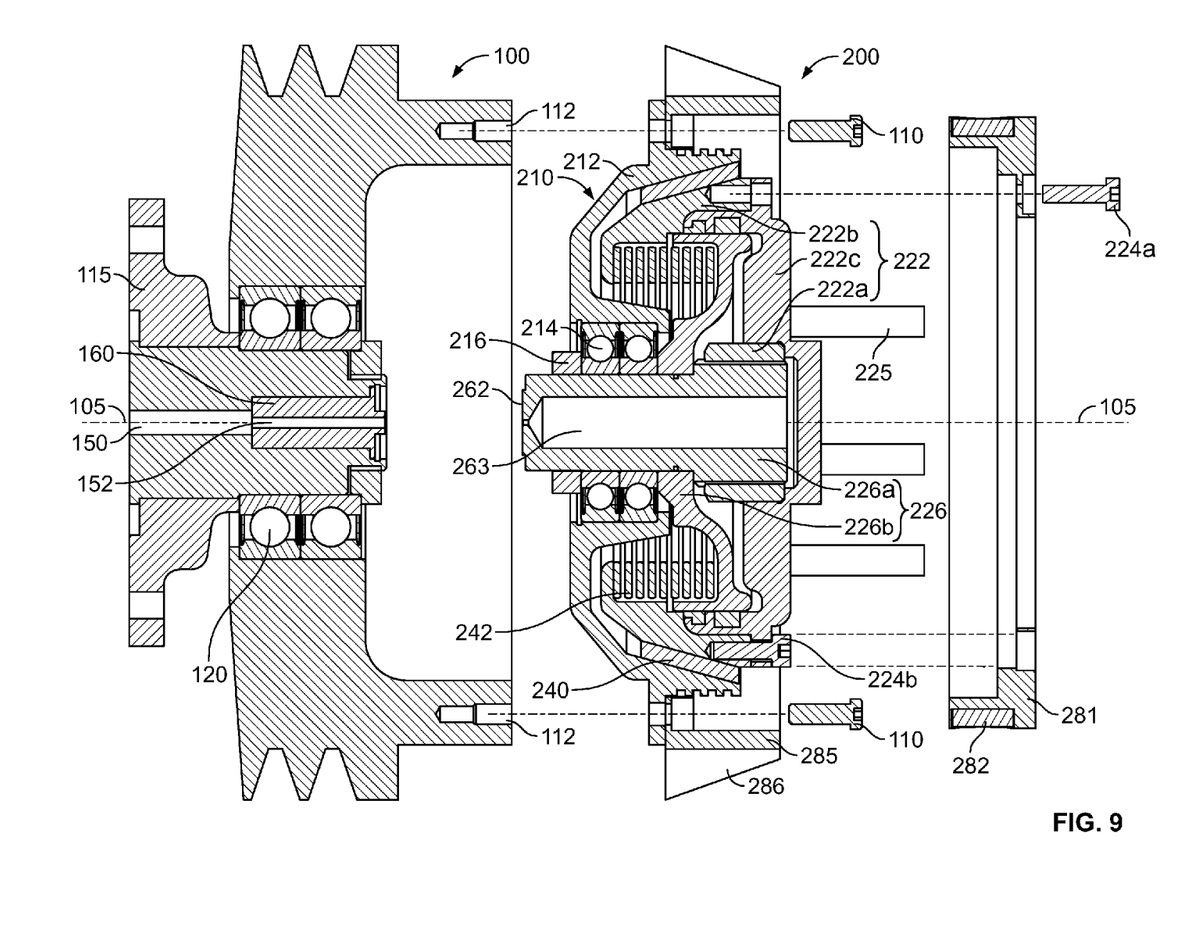
FIG. 9 is a cross-sectional exploded view of a clutch system in accordance with some embodiments.

Referring now to FIG. 9, the clutch device 200 can be configured such that the piston 222, hub 226, spring 242, and other components remain in an assembled state even after the clutch device 200 is removed from the drive pulley 100. In such circumstances, the spring 242 is not necessarily free to unexpectedly expand and separate the components when a user attempts to remove the clutch device 200 from the drive pulley 100. Thus, the clutch device 200 in this embodiment has a self-contained construction that permits the clutch device 200 to be readily removed from the drive pulley 100 without requiring clamps or other tooling to retain the clutch device 200 in its assembled state. The locking nut 216 and other such devices may be subsequently removed to disassemble the components of clutch device 200 (e.g., the piston 222, hub 226, spring 242, clutch ring 240, and the like) at a subsequent time.

In the embodiment depicted in FIG. 9, the clutch device 200 is mounted to the drive pulley 100 by the mounting bolts 110. The magnet ring 281 can be readily removed from clutch device 200 so as to provide access to the mounting bolts 110. As previously described, the piston 222 includes the mounting plate 222c and the spring-engaging member 222b that are assembled together using the assembly bolts 224a-b. A subgroup of these bolts 224a are configured to also retain the magnet ring 281 to the piston 222. A second subgroup of these bolts 224b merely pass through corresponding bores in the magnet ring 281 without engaging the magnet ring 281. Thus, as shown in FIG. 9, the magnet ring 281 can be readily removed from the clutch device 200 by removing the bolts 224a while the other bolts 224b remain assembled to the piston 222. It should be understood from the description herein that the second bolts 224b remain in place so as to maintain the assembled relationship of the piston 222 as depicted in FIG. 9. If desired, these second bolts 224b can be removed (e.g., to disassemble the piston 222, hub 226, spring 242, clutch ring 240, and other components) at a subsequent time after the clutch device 200 is fully removed from drive pulley 100.

After the magnet ring 281 is removed to provide access to the mounting bolts 110, the clutch device 200 can be promptly removed from the drive pulley 100 by withdrawing the bolts 110 from the mounting cavities 112 of the drive pulley 100. Upon removal of the bolts 110 and separate from the drive pulley 100, the internal spring 242 is not permitted to freely expand and thereby cause disassembly of the clutch device 200 (e.g., the spring 242 is not permitted to unexpectedly expand and separate the piston 222 and hub 226 when a user attempts to remove the clutch device 200 from the drive pulley 100). Instead, the components of the clutch device 200, such as the input plate 212, the piston 222, the hub 226, the clutch ring 240, and the spring 242, remain in the assembled state during the process of removal from the drive pulley. As previously described, the locking nut 216, the assembly bolts 224a, and other such devices can be subsequently removed to disassemble the clutch device 200 at another time (e.g., after the clutch device 200 is transported to a work bench or other area).

It should be understood from the description herein that the conductive ring 285 can be separated from the input plate 212 after the mounting bolts 110 are withdrawn. Accordingly, the magnet ring 281 and the conductive ring 285 can be removed from the clutch device 200 while the other components of the clutch device 200 (e.g., the input plate 212, the piston 222, the hub 226, the clutch ring 240, and the spring 242) remain in the assembled state. Such a configuration permits a user to readily service or replace the components of the eddy current drive system 280 without disassembly of the input portion 210 and output portion 220 of the clutch device 200.

Accordingly, the clutch device 200 can have a self-contained construction that permits the clutch device 200 to be readily removed from the drive pulley 100 without requiring clamps or other tooling to retain the clutch device 200 in its assembled state. In such circumstances, the spring 242 is not free to unexpectedly expand and separate the components when a user attempts to remove the clutch device 200 from the drive pulley 100. Such a configuration can provide additional safety for the technician or other user and can reduce the complexity of repairing or replacing the clutch device 200 when servicing a vehicle.

Optionally, in some embodiments, the conductive ring 285 can be removed from the clutch device 200 in a manner similar to the removal of the magnet ring 281. Like the two groups of assembly bolts 224a and 224b, the mounting bolts 110 may be divided into two subgroups—a first subgroup 110a configured to secure the conductive ring 285 to the input plate 212 and a second subgroup 110b that passes through the conductive ring 285 and engages only the input plate 212 (for mounting to the drive pulley 100). In such circumstances, the user can remove only the first group of bolts 110a to separate the conductive ring 285 from the clutch device 200 while the second group of bolts 110b retains the clutch device 200 to the drive pulley 100. Thereafter, the second group of bolts 110b can be removed to separate the clutch device 200 from the drive pulley 100 for repair or replacement.

It should be understood from the description herein that the drive source may have a configuration other than the drive pulley 100 shown in FIGS. 1-2. For example, the drive source 100 may be a shaft or gear that is urged to rotate by the engine (via a direct or indirect coupling). In such embodiments, the input plate 212 or other component of the input portion 210 can have a mounting configuration to removably attach to that particular drive source or may have an adapter member connected therebetween.

In other embodiments, some embodiments of the clutch device 200 can be arranged such that spring 242 biases the output portion 220 to the disengaged position (rather than the bias toward the engaged position as described in connection with FIG. 2). Accordingly, the clutch device 200 can be configured so that the spring 242 biases the clutch ring 240 to disengage from the opposing friction surface 215. In such embodiments, the chamber 264 may be configured such that fluid pressure therein causes the piston 222 to shift toward engaged position in which the clutch ring 240 contacts the opposing friction surface 215.

In yet another embodiment, the clutch ring 240 may be mounted to the input plate 212 or to another component of the input portion 210. In these embodiments, the opposing friction surface may be arranged on a portion of the piston 222 or otherwise coupled to the output portion 220. As such, the piston 222 can be actuated to cause the friction surface of clutch ring 240 to be selectively engaged or disengaged with the opposing friction surface.

A number of embodiments of the invention have been described. Nevertheless, it will be understood that various modifications may be made without departing from the spirit and scope of the invention. Accordingly, other embodiments are within the scope of the following claims.

What is claimed is:

1. A fan clutch device to be mounted to a drive pulley, the fan clutch device comprising:
    an input portion that is removably mountable to the drive pulley so that the input portion rotates with the drive pulley;
    an output portion including a hub that is selectively movable relative to the input portion, and a piston adjustable in an axial direction relative to the input portion, the piston being adjustable between first and second positions, wherein the output portion rotates at a first speed with the input portion when the piston is in the first position; and
    an eddy current drive system that urges the output portion to rotate at a second speed different from the first speed when the piston is adjusted to the second position, the eddy current drive system including permanent magnets coupled to the output portion, and an electrically conductive ring coupled to the input portion and arranged radially outward from the permanent magnets so that a radial gap is defined between the permanent magnets and the ring,
    wherein the electrically conductive ring comprises radially extending cooling fins to dissipate heat, the cooling fins being rotatably related to the drive pulley at all times when the input portion is mounted to the drive pulley, and
    and wherein the cooling fins of the conductive ring are tapered such that each of the cooling fins is larger in size proximate to the drive pulley when the input portion is mounted to the drive pulley.

2. The fan clutch device of claim 1, further comprising a clutch ring coupled to one of the input portion and the output portion and an opposing friction surface coupled to the other of the input portion and the output portion, the clutch ring including a clutch surface that engages the opposing friction surface when the piston is in the first position so that the output portion rotates at the first speed with the input portion.

3. The fan clutch device of claim 2, wherein the clutch ring comprises a frusto-conical clutch ring that provides a conical wedging action when engaged with the opposing friction surface.

4. The fan clutch device of claim 3, wherein in response to the piston being adjusted from the first position to the second position, the permanent magnets are displaced relative to the conductive ring while the radial gap therebetween remains substantially constant.

5. The fan clutch device of claim 1, wherein the permanent magnets are oriented to face radially outward so that an inner circumferential surface of the conductive ring is adjacent to the permanent magnets, the radial gap being at least partially defined by the permanent magnets and the inner circumferential surface of the conductive ring.

6. The fan clutch device of claim 1, wherein the permanent magnets and the conductive ring are removable from the clutch device while the input portion and output portion remain in an assembled state.

7. The fan clutch device of claim 1, wherein the conductive ring is formed from a generally nonmagnetic material comprising aluminum.

8. The fan clutch device of claim 7, wherein the generally nonmagnetic material is electrically conductive so as to generate eddy currents in the conductive ring in response to relative motion between the permanent magnets and the conductive ring.

9. A fan clutch device to be mounted to a drive pulley, the fan clutch device comprising:
    an input portion that is removably mountable to the drive pulley so that the input portion rotates with the drive pulley;
    an output portion including a hub that is selectively movable relative to the input portion, and a piston adjustable in an axial direction relative to the input portion, the piston being adjustable between first and second positions, wherein the output portion rotates at a first speed with the input portion when the piston is in the first position; and
    an eddy current drive system that urges the output portion to rotate at a second speed different from the first speed when the piston is adjusted to the second position, the eddy current drive system including permanent magnets coupled to the output portion, and an electrically conductive ring coupled to the input portion and arranged radially outward from the permanent magnets so that a radial gap is defined between the permanent magnets and the ring,
    wherein the electrically conductive ring comprises radially extending cooling fins to dissipate heat, the cooling fins being rotatably related to the drive pulley at all times when the input portion is mounted to the drive pulley, and
    wherein the permanent magnets and the conductive ring are removable from the clutch device while the input portion and output portion remain in an assembled state.

10. The fan clutch device of claim 9, further comprising a clutch ring coupled to one of the input portion and the output portion and an opposing friction surface coupled to the other of the input portion and the output portion, the clutch ring including a clutch surface that engages the opposing friction surface when the piston is in the first position so that the output portion rotates at the first speed with the input portion.

11. The fan clutch device of claim 10, wherein the clutch ring comprises a frusto-conical clutch ring that provides a conical wedging action when engaged with the opposing friction surface.

12. The fan clutch device of claim 9, wherein the permanent magnets are oriented to face radially outward so that an inner circumferential surface of the conductive ring is adjacent to the permanent magnets, the radial gap being at least partially defined by the permanent magnets and the inner circumferential surface of the conductive ring.

13. The fan clutch device of claim 9, wherein in response to the piston being adjusted from the first position to the second position, the permanent magnets are displaced relative to the conductive ring while the radial gap therebetween remains substantially constant.

14. The fan clutch device of claim 9, wherein the cooling fins of the conductive ring are tapered such that each of the cooling fins is larger in size proximate to the drive pulley when the input portion is mounted to the drive pulley.

15. The fan clutch device of claim 9, wherein the conductive ring is formed from a generally nonmagnetic material comprising aluminum.

16. The fan clutch device of claim 15, wherein the generally nonmagnetic material is electrically conductive so as to generate eddy currents in the conductive ring in response to relative motion between the permanent magnets and the conductive ring.

* * * * *